Jan. 15, 1935.  J. B. HENDERSON  1,987,680
APPARATUS FOR MEASURING, INDICATING, AND COMPARING AZIMUTHS ON BOARD SHIPS
Filed Aug. 28, 1926  3 Sheets-Sheet 1
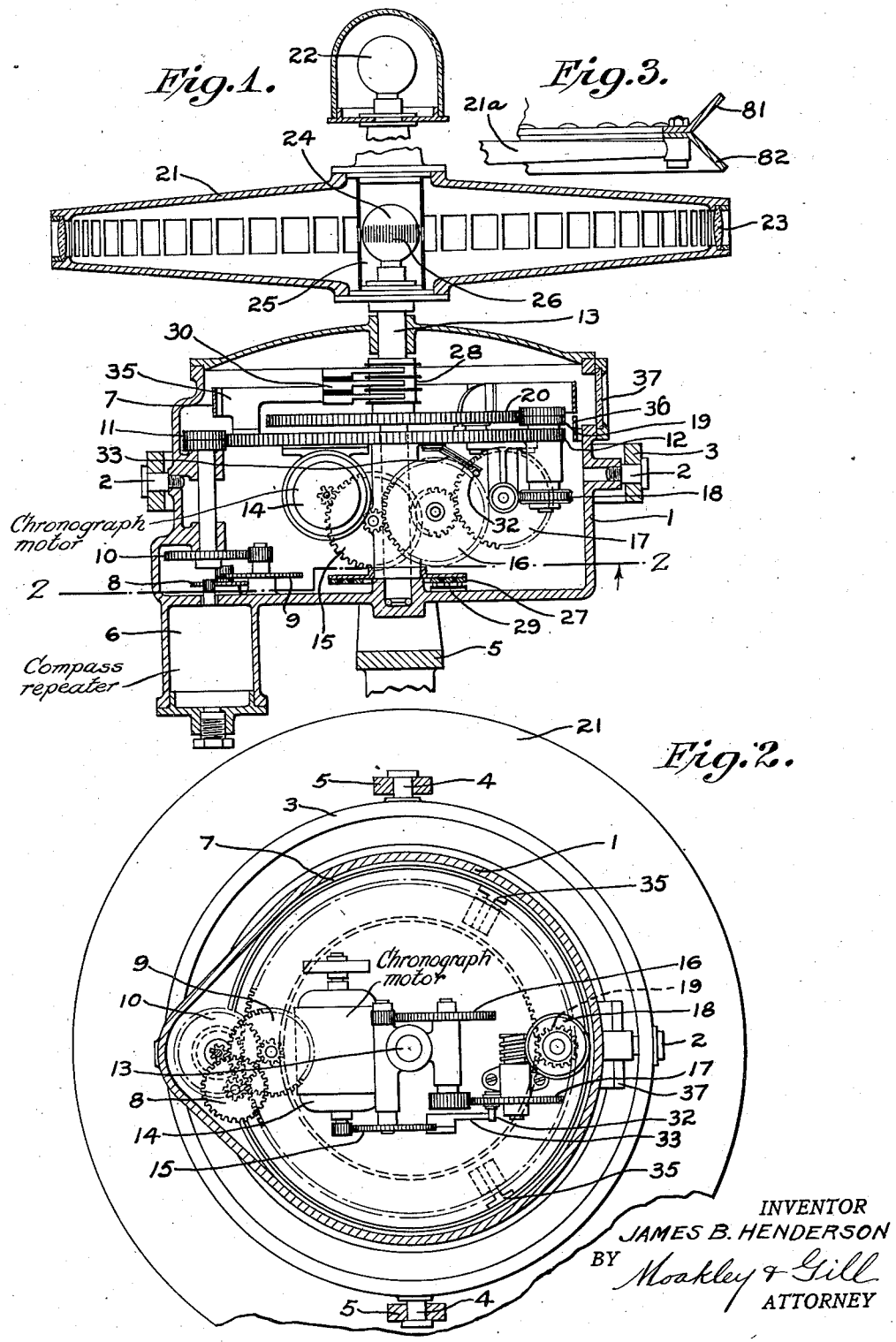

Jan. 15, 1935.    J. B. HENDERSON    1,987,680
APPARATUS FOR MEASURING, INDICATING, AND COMPARING AZIMUTHS ON BOARD SHIPS
Filed Aug. 28, 1926    3 Sheets-Sheet 2
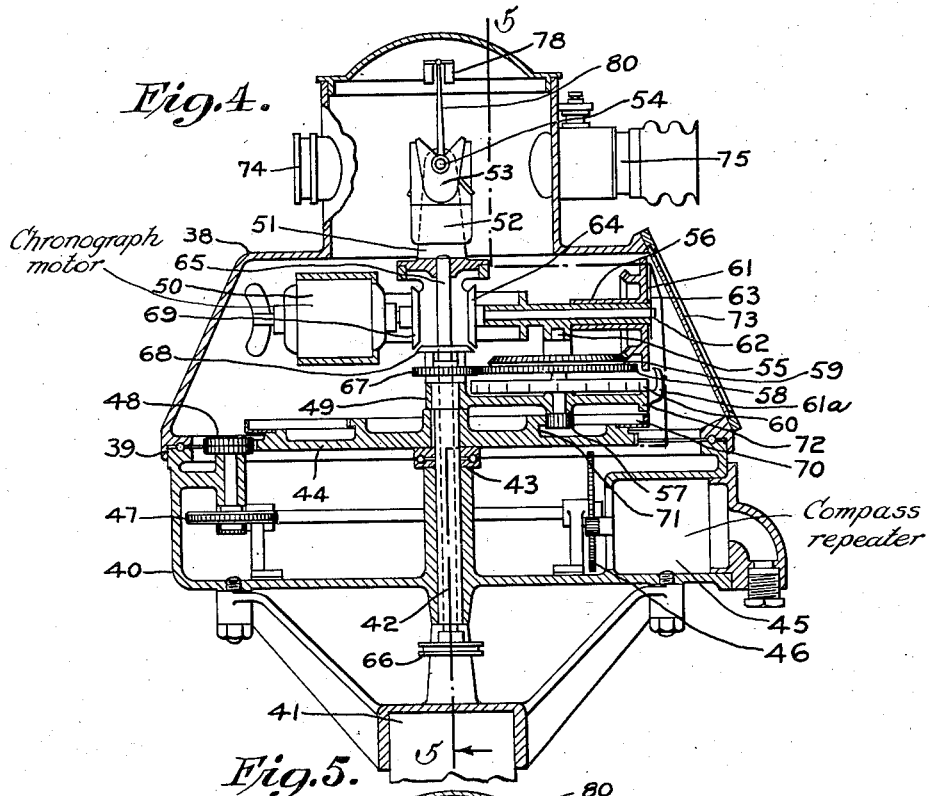
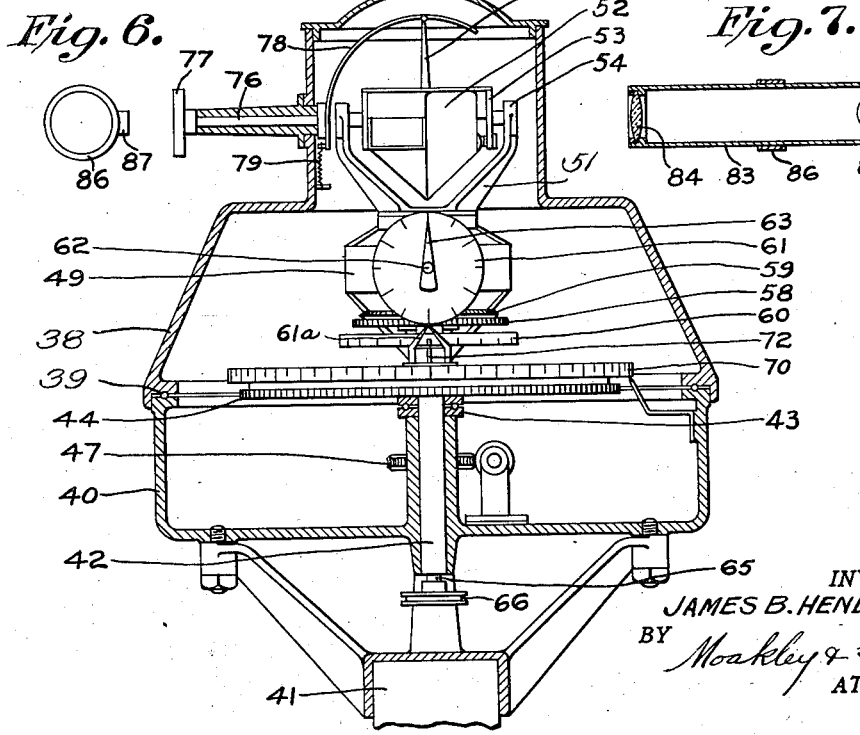
INVENTOR
JAMES B. HENDERSON
BY Moakley & Gill
ATTORNEY Jan. 15, 1935.  J. B. HENDERSON  1,987,680
APPARATUS FOR MEASURING, INDICATING, AND COMPARING AZIMUTHS ON BOARD SHIPS
Filed Aug. 28, 1926    3 Sheets-Sheet 3
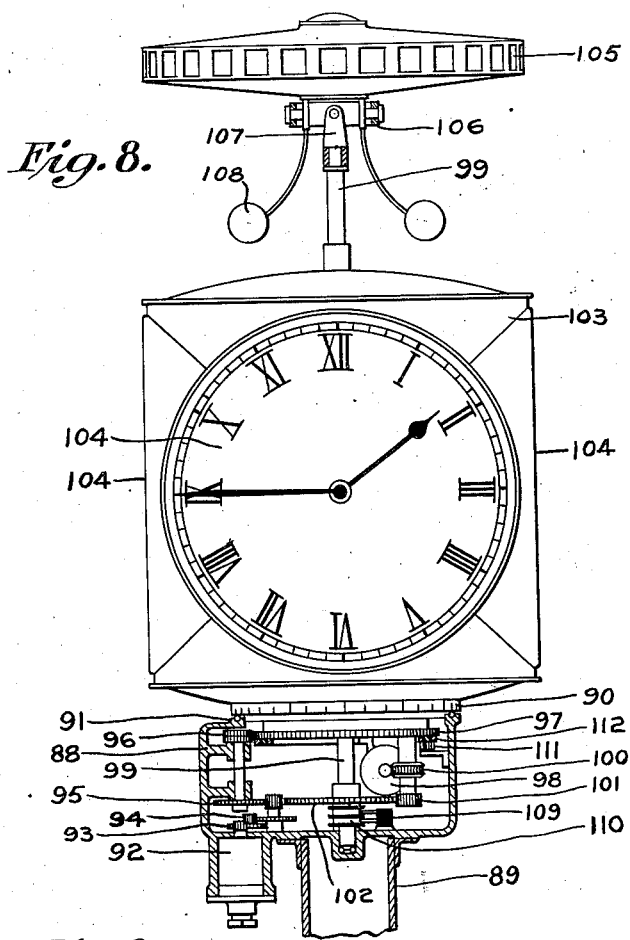
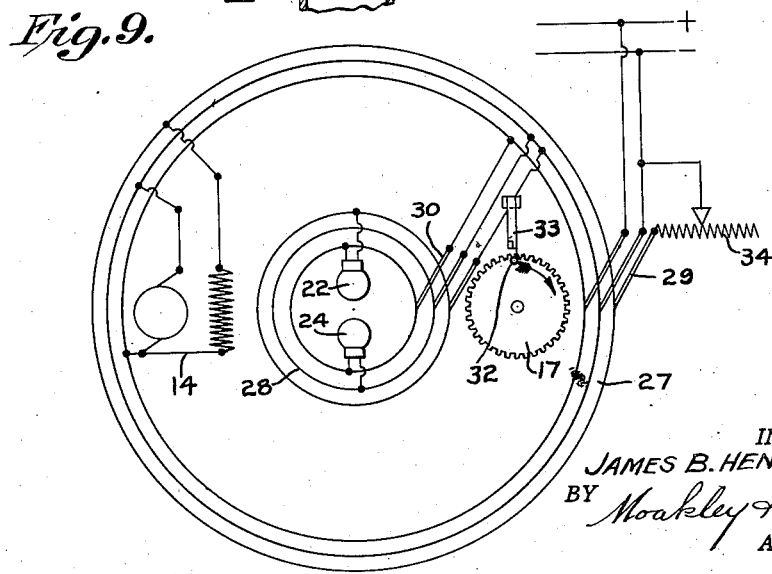
INVENTOR
JAMES B. HENDERSON
BY Moakley & Gill
ATTORNEY Patented Jan. 15, 1935

1,987,680

UNITED STATES PATENT OFFICE 1,987,680

APPARATUS FOR MEASURING, INDICATING, AND COMPARING AZIMUTHS ON BOARD SHIPS

James Blacklock Henderson, Blackheath, England

Application August 28, 1926, Serial No. 132,252
In Great Britain September 28, 1925

22 Claims. (Cl. 33—72)

My invention relates to methods of measuring, indicating and comparing azimuths on board ships at sea and has for its object the provision of means for accurately measuring and indicating azimuths on board a ship and further means for signalling, automatically or semi-automatically, from one ship to another, information to enable one of the ships to compare the azimuth of her compass, or other azimuth indicator, with that of the compass on the other ship. It also provides means for a single ship in proximity to land to determine the accuracy of her compass by reference to a true North bearing accurately determined ashore.

It is known that gyro compasses are subject to greater or less disturbance which it is sometimes difficult to detect, also that quite apart from disturbance the compasses of any two ships seldom agree absolutely with each other. When ships are sailing in consort, as in a convoy, it is at least advisable that all should be able to steer to a common datum of azimuth, even if their compasses disagree. My invention aims at providing such a datum by enabling each ship in a convoy at any time to check her compass with that of the leader of the convoy or any other specially appointed ship.

To carry out my invention I employ two instruments of different type, which I shall call a "transmitter" and a "receiver" respectively, the transmitter being mounted on the leader or appointed ship, which I shall call the "leader", and a receiver being installed on each of the other ships of the convoy, to which I shall refer as "consorts." By means of these two instruments it is possible for an observer on any consort to determine at any time the bearings relatively to the compasses of both ships of a predetermined common azimuth, or of two azimuths differing by 180°, the azimuth which I prefer to use being that of the common line of sight joining the two instruments. The receiver which I propose to use is an instrument which I have designed for a dual purpose, one of which is to provide means to enable an observer on board a ship to determine accurately the azimuth of any visible object relatively to the ship's compass. The second purpose, which depends on fulfilment of the first, is the provision of means for comparing the ship's compass with a compass on another ship, or with a compass or zero direction determined ashore. This second object requires a receiver on the first ship and a transmitter on the other ship or shore station.

Since the second purpose of the invention includes the first, it will be sufficient to describe the second in detail and merely to outline the modifications or simplifications of the receiver if only the first object be aimed at. There are also certain differences between a ship's transmitter and a shore transmitter, the latter being a simplified form of the former. The former will therefore be described in full and illustrated, and the simplifications permissible in the case of a shore transmitter pointed out.

To effect the second, or main, purpose of my invention a transmitter is mounted on the leader in an elevated position on the superstructure or in any other convenient position from which it can be seen by all the consorts. In this respect it may possibly be necessary or advisable to install two or more transmitters on the leader, say one forward and the other aft, or one on the port side and the other to starboard. The transmitter is an instrument designed to make automatically a preconcerted signal or sequence of signals to all the consorts giving the azimuth of the line of sight to the particular consort's receiver as read on the leader's gyro compass. An observer at the receiver reads simultaneously the bearing of the line of sight on his own compass and from the difference between the observed and the signalled bearings he knows at once the deviation between his own and the leader's compasses at the moment. The leader's compass is taken as standard and all the consorts can either correct their compasses into agreement with it or else make allowance for the difference. The transmitter is entirely automatic and an observer is required only at the receiver. He can make a comparison at any time he pleases and as often as he pleases. No collaboration of observers is necessary and the measurement is independent of the relative position, speed and course of the two ships so long as the transmitter is visible from the receiver. I also include in the receiver means to eliminate all necessity for calculation, the difference between the signalled and the observed bearings being indicated on a scale from which the relative deviation of the compasses can be read off at leisure.

In the case of a shore station the transmitter can be simplified on account of the fact that on land a compass is unnecessary since the instrument can be accurately and permanently oriented when first erected. The result of this is that a passing ship fitted with a receiver, by making the same observation as has already been described, actually determines the error of her compass with reference to true north. When it is remembered that most gyro compasses are subject to error due to changes in the speed or course of the ship and that these errors can be cumulative and reach a substantial total when several such changes are made in close succession, it will be realized that there is a greater need for an accurate check on a ship's compass in proximity to land than on the open sea, since it is in harbours and pilotage waters that speed and course have to be changed most frequently. Transmitters embodying my invention would therefore be most useful to navigation if erected on dangerous spots in estuaries and harbours or restricted channels, also on promontories or lighthouses where ocean-going ships make their departures or landfalls.

A clear comprehension of the invention will be obtained from the following detailed description and from the attached drawings, Figs. 1 to 9.

Fig. 1 represents in sectional elevation the transmitter instrument, of the preferred embodiment of the invention, on the leader.

Fig. 2 is a part-sectional plan of the same instrument, looking upwards taken on line 2—2 of Fig. 1.

Fig. 3 illustrates an alternative to part of Figs. 1 and 2.

Fig. 4 shows the receiver of the preferred embodiment of the invention on the consort in part-sectional elevation, viewed at right angles to the line of sight.

Fig. 5 is a part-sectional elevation of Fig. 4, taken on line 5—5 of Fig. 4, looking along the line of sight.

Figs. 6 and 7 illustrate an alternative to part of Figs. 4 and 5.

Fig. 8 is a part-sectional elevation of another type of transmitter.

Fig. 9 is a diagram of electrical connections for the transmitter shown in Figs. 1 and 2.

In Figs. 1 and 2 the casing 1 is supported on trunnions 2 on the gimbal ring 3 which in turn is supported on trunnions 4 (Fig. 2) on the fork-pedestal 5, fixed to the upper deck of the ship. The step-by-step or repeater motor 6, shown conventionally, is fixed to the casing 1, and is controlled by the master gyro-compass of the ship and drives the secondary compass card 7 through the treble-reduction spur gearing 8, 9, 10, the split pinion 11 and the spur wheel 12. The spur wheel 12 is mounted rotatably on the vertical shaft 13 and has fixed to it the chronograph motor 14 which drives the shaft 13 through the treble-reduction gearing 15, 16, 17 (Fig. 2), worm wheel 18, pinion 19 (Fig. 1) and spur wheel 20. The vertical shaft 13 carries the multiple collimator 21 and at a little height above it, the lamp 22, which I call the zero lamp. The multiple collimator 21 comprises sixty objectives 23, exactly six degrees apart, a lamp 24 and a tube 25, preferably highly polished inside to reflect the light from the lamp 24, and having sixty vertical slits 26 cut in it, spaced at six degrees apart, each slit being exactly in a line between the lamp 24 and the centre of an objective. The objectives 23 are shown square in shape but may of course be circular. Current is led to the lamps 22 and 24 and to the chronograph motor 14 by means of the slip-rings 27 fixed to the spur wheel 12, and 28 fixed to the shaft 13, and the brushes 29 fixed to the casing 1, and 30 fixed to the spur wheel 12, as shown in the diagram of connections, Fig. 9, the current to the zero lamp 22 being interrupted momentarily at each revolution of the spur wheel 17 by the insulated pin 32 (Fig. 1) engaging with the contacts 33 and separating them. Alternatively the contacts 33 may be arranged to be normally separated and to be placed in contact momentarily by the pin 32 so that the lamp 22 will flash once for each turn of the wheel 17. The wheel 17 makes one revolution for every six degrees motion of the collimator and the lamp 22 is thus momentarily eclipsed (or switched on) as each of the sixty collimators passes a 6° mark on the compass card.

The speed of the chronograph motor may be regulated by adjustment of a resistance 34 (Fig. 9) in its field circuit. The secondary compass card 7, which is in the form of a cylindrical ring, is supported on a spider 35 fixed to the hollow spindle of the spur wheel 12 and is read against a lubber line 36 visible through the window 37. The parts are assembled so that when the reading against the lubber line is zero or a multiple of 6° the momentary opening, or closing, of the switch 33 is taking place in the circuit of the zero lamp and the beams from all the collimators are exactly over the 6° marks on the compass card. The chronograph motor 14 runs at constant speed. Hence if an observer on a consort measures the time interval between the momentary occultation (or flash) of the zero lamp and the next succeeding occultation (or flash) of the collimator 21 and knows the rate of rotation of the collimator, he can determine the angle between his line of sight at the moment of the collimator's flash and the azimuth of the 6° division of the leader's compass last passed by the collimator. The consort's receiving instrument for making and recording this observation is shown in Figs. 4 and 5.

The receiver has a casing comprising two parts, an upper part or turntable 38 resting on a ball race 39 on the lower part 40, which is fixed to a pedestal 41 on the deck of the ship in a position from which the transmitter is most easily seen. The lower part contains a secondary compass card 44 which is driven from the consort's master compass by the step-by-step motor 45, shown conventionally in the drawings, through the spur gears 46, worm gears 47 and split pinion 48. The card 44 is fixed to the hollow spindle 42 and its weight is supported by the ball race 43.

The upper part of the case carries the objective 74 and eyepiece 75 of a sighting telescope, also a glass window 73 through which the scales of the instrument can be viewed. The prisms of the sighting telescope are similar to those shown in my prior U. S. Patent 1,580,298 granted April 13, 1926, the present prisms are however stabilized in azimuth only. By using this expedient I am able, by stabilizing a comparatively small mass, to obtain the same results as would be obtained if the whole sighting telescope were stabilized in azimuth. The prisms of the sighting telescope are stabilized in azimuth by the compass card 44 but can be rotated in azimuth relatively to the card by hand. For this purpose the prisms 52 are supported in a frame 53 which is mounted on horizontal trunnions 54 in a fork 51, the fork being rigidly attached to a spider 49 pivoted on the central hollow shaft 42. The spider 49 is linked to the compass card 44 by a double reduction epicyclic gear consisting of two epicyclic pinions 57 and 58 fixed to a vertical spindle 55 pivoted on the spider 49, the pinions gearing respectively with a central toothed wheel 71 fixed to the compass card and a pinion 67 fixed to a thin central spindle 65, the lower end of which projects through the bottom of the case and is furnished with a hand-knob 66. By turning the knob the observer using the instrument can turn the spider 49 and the prisms 52 in azimuth relatively to the compass card 44, but when the knob 66 is free the prisms are stabilized in azimuth by the compass card, for the rotation of the compass card through central toothed wheel 71 and pinion 57 causes a like rotation of spider 49 about central hollow shaft 42 thus rotating the prisms in azimuth with it since they are mounted to move in azimuth with spider 49, so that yawing or turning of the ship does not disturb the line of sight of the telescope. The spindle 55 carries also a drum 60 on which a scale is engraved and the compass card 44 has its scale engraved on a drum 70 coaxial with the card. A vertical line 72 on the spider 49 (shown more clearly in Fig. 5) can be read against the two scales on the drums 60 and 70. The reading of the scale 70 gives the compass azimuth of the prisms and therefore of the line of sight of the telescope to the nearest degree, and the scale 60, which has 10 degrees on its whole periphery, gives the minutes. The prisms and scales are adjusted when assembled so that when the pointer 72 agrees with the zero of scale 60 it also agrees with a 10 degree division on scale 70 and the line of sight of the telescope has accurately the same azimuth as the pointer 72.

The prisms 52 can be elevated and depressed about the trunnions 54 to cope with the rolling of the ship by means of a handle or knob 77 (Fig. 5) which projects through the case 38. This handle 77 is fixed to a spindle 76 to which a forked arm 78 is attached, the jaws of the fork engaging with the upper end of a stem 80 fixed to the prism carrier 53. The arm 78 is kept normally vertical by a spring 79.

The parts of the receiver described up to this point constitute all the mechanism required for determining the compass of any visible object on the horizon. If the upper part of the case is swung round so as to point the telescope roughly at the object and an observer, looking into the eyepiece, trains the prisms carefully on the object by means of the knob 66, the pointer 72 will then indicate on the scales 60 and 70 in degrees and minutes the azimuth of the object at the moment when he stopped training.

The remainder of the receiver mechanism is concerned with the measurement of the azimuth of the receiver from the distant transmitter and with the collation of the two measurements to determine the relative compass error. The spider 49 carries a chronograph motor 50, a dial 61 and a pointer 63. The motor 50 is shown as of the clockwork type, its spindle revolving at a uniform rate of, say one revolution per minute and driving the friction bevel 69 which is attached to it. The pointer 63 is fixed to the horizontal spindle 62 which carries a corresponding friction bevel 64 and these two bevels can be mutually engaged by means of a third friction bevel 68 which is pivotally mounted on the central spindle 65. This spindle has an endwise movement so that by pushing the knob 66 upwards the three bevels are engaged and the pointer 63 at once commences to revolve at one revolution per minute. The dial 61 is pivoted on the spider coaxially with the pointer 63 and is geared to the spindle 55 by two bevel gear wheels 59. The dial 61 thus revolves with the change of azimuth of the sighting telescope and I arrange that one revolution of the dial corresponds to 6° in azimuth. A fixed pointer 61a is mounted on any convenient part of the spider 49 for reading against the dial 61 and the dial is arranged so that its zero mark is opposite the pointer 61a when the pointer 72 is opposite a 6° graduation. The reading of the scale 61 against the pointer 61a therefore gives at all times the difference between the azimuth of the line of sight and the next lower multiple of 6°. That is to say, if the pointer 72 reads 124° 32' on the scales 60 and 70, the pointer 61a will read 4° 32' on the dial 61.

The manner of operating the receiver is as follows. The observer pushes up the knob 66 to engage the chronograph motor with the pointer 63, and rotates the pointer into alignment with the fixed pointer 61a (not the zero of dial 61), where he disengages the pointer 63. He then swings round the turntable 38 until the telescope is roughly pointed at the leader. He then looks through his telescope and trains the prisms by the knob 66 until he sees the leader in the centre of his field of view, when he trains accurately on the zero lamp of the transmitter. In this respect it is preferable to have the zero lamp momentarily eclipsed than to have it momentarily flashed, as the steady beam between flickers gives the observer a better mark to train on. When he sees the zero lamp flicker he immediately pushes up the knob 66 and continues to train accurately by the knob until he sees the leader's collimator flash, when he at once pulls down the knob and stops training simultaneously. He can then read the scales at his leisure since their setting at the moment when he stopped training remains fixed. The pointer 72 gives on the scales 60 and 70 the degrees and minutes of azimuth of his line of sight at the moment when he stopped training. This same measurement, less multiples of 6°, is given by the dial 61 and pointer 61a. The pointer 63 has been engaged with the chronograph for the period between the two signals and since it moves at the same speed as the collimator it has therefore moved relatively to the pointer 61a through the same angle through which the collimator has moved in the same time, i. e. since the collimator last passed a 6° mark on the leader's compass. That is to say, the pointer 63 and pointer 61a indicate the azimuth of the line of sight as read on the leader's compass at the moment the observer stopped training, less multiples of 6°. The dial 61, as we have seen, gives the azimuth of the line of sight on the consort's compass at this same moment, less multiples of 6°. The scale reading of the pointer 63 on the dial 61 therefore gives the difference between the two azimuths, which is the same as the difference betwen the zeros of the two compasses. The reading of the scale 61 and pointer 63 therefore gives the desired comparison without any calculation. In this I am assuming that there is no personal error on the part of the observer, either in the accuracy of his training or in the accuracy of timing the two signals. As regards training, since the stabilization of the line of sight eliminates the possibility of error through yawing of the ship, the only movement in his field of view with which the observer has to deal is that due to change of bearing so that accuracy should be of a very high order. In operating the clutch of the pointer 63 there will probably be a certain lag, but if the lag in clutching and declutching are equal there will be no resulting error from this cause. In any event the error in the measurement is very small, as will be seen from the following considerations.

The numerical constants, 6°, 60 collimators etc., which I have selected in the above description are arbitrary and by no means essential so long as they are whole fractions of 360. They have, however, an effect on the accuracy attainable. If in Fig. 1 a single collimator were used, making one revolution per minute, then if the observer made an error of one-quarter of a second in timing the interval between the two signals the resulting error in the recorded measurement would be 360°/240, or 1½ degrees, which could not be considered a permissible error. By having 60 collimators spaced at 6° as described, a ¼ second error in timing involves an error in the azimuthal measurement of only 6°/240, or 1½ minutes of arc, which may be unnecessarily fine. The constants may therefore be selected to suit the limits of accuracy aimed at and the probable personal error of the observer. For instance 24 collimators spaced at 15° with even one-half of a second error in the timing would entail an error in the angular measurement of only 7½ minutes of arc.

The collimators on the transmitter should revolve in azimuth in the same direction as the run of the compass card graduations, i. e. in a N—E—S—W direction and the pointer 63 should revolve on the dial 61 in the direction of increasing azimuths. Otherwise the pointer 63 will indicate the difference between the azimuth of the line of sight at the transmitter and the next higher multiple of 6°, so that the required comparison could not be made without a small calculation.

There may be objections to having a multiple collimator flashing round the horizon continuously like a miniature lighthouse, particularly as observations would be required only occasionally, but it is also desirable to provide for these observations being made by any consort at any time without having to call up the leader. I have therefore devised an alternative scheme by which the collimator flash from the leader is actually furnished by the consort, so that it need be turned on only when required and for the few minutes needed for an observation.

For this purpose instead of having a multiple collimator on the leader I have a single collimator on the consort and a multiple reflector on the leader by which the beam from the consort's collimator is reflected back to the receiver. Fig. 3 shows a section of the reflector which in this case would take the place of the multiple collimator 21 in Fig. 1, and Figs. 6 and 7 show the collimator which would be fitted to the receiver in place of the knob 77, the observer elevating the prisms by tilting the collimator, so that by keeping the image of the zero lamp in the centre of his field of view the observer would at the same time keep the collimator laid on the reflector.

The reflector consists of two rings 81 and 82 of rustless steel riveted together and mounted on a spider 21a. The faces of the two rings are at right angles to each other and are machined in pyramidal form of 60 sides so that they constitute a series of 60 double reflectors. The collimator, shewn in Figs. 6 and 7, consists of a tube 83 having at one end an objective 84 and at the other end a lamp 85 in the focus of the objective. It is held in a ring 86 having a projecting boss 87 which is fixed to the spindle 76 in place of the knob 77. Alternatively the reflector may consist of a series of double reflection prisms disposed symmetrically round the periphery of a horizontal wheel and spaced at 6° from each other, with their hypotenuse sides vertical and their double reflecting edges horizontal and towards the centre of the wheel.

In the receiver of this alternative type a better construction is to mount the single collimator rigidly on the prism carrier 53 so that the prisms and collimator move together both in elevation and in training, the knob 77 being retained for elevation. This control of the collimator in training permits of the use of a narrower and more concentrated beam which would provide clearer signals, since if the collimator is mounted in place of the knob 77, as first suggested, yawing and turning of the ship, of which the observer would be unaware since his line of sight is stabilized in azimuth, would throw the centre of the collimator beam off the distant reflector, with the result that he might get a poor signal or even miss the signal altogether, unless the collimator had a wide angle beam. Still another alternative is to attach the whole upper part of the receiver case to the spider 49 so that the whole of the telescope and collimator is stabilized in azimuth but manually displaceable in training, instead of the prisms only. This would necessitate the use of a more powerful step-by-step motor 45.

The receiver may be simplified if means are provided at the transmitter to indicate the azimuth of the collimator, so that this indication may be noted visually by the observer at the instant when the collimator flash is seen. The receiver chronograph mechanism would then be unnecessary. A transmitter suitable for this purpose is illustrated in Fig. 8.

The casing 88 is mounted on a pedestal 89 fixed to the deck of the leader. The cover 90 of the casing rests on a ball race 91 and is stabilized in azimuth by the step-by-step motor 92 controlled by the master compass to drive the cover 90 through the spur gears 93, 94, 95, the split pinion 96 and the spur ring 97 fixed to the cover. This cover also carries the chronograph motor 98 which drives the vertical shaft 99 through the worm gear 100 and the pinion 101 engaging with the spur wheel 102 fixed to the shaft 99. Fixed to the cover is a cubical box 103 having four clock faces 104, one on each of its vertical faces, the hands of the four clocks being driven by bevel gearing from the shaft 99. The multiple collimator 105 is mounted on trunnions on the gimbal ring 106, which in turn is mounted on trunnions on the fork 107 fixed to the upper end of the shaft 99. Weights 108 attached to the collimator give it gravitational stability so that its beams remain approximately horizontal although the ship may be rolling. If the parts are assembled and the gears proportioned so that the clocks read 12 o'clock each time one of the collimators crosses the zero of the compass card and if the collimator beams are 12 degrees apart, then the time read on the clock face when a flash from the collimator is seen will indicate in degrees and minutes the azimuth of the line of sight relatively to the 12° mark on the leader's compass last passed by the collimator, irrespective of the speed of the collimator, which need not even be constant. The receiver in this case need only be the simple form first described, as it is needed only to measure the azimuth of the line of sight on the consort's compass. The observer simply keeps his receiver telescope trained on the transmitter or on the centre of the clock until he sees a flash from the collimator. At that instant he notes the time on the clock and releases his knob 66. He then reads his scales 60 and 70 on the receiver and deducts multiples of 12° and compares the result with the time on the clock. For example if the clock reads 3:25 when the collimator flashes and the receiver scales read 125° 30', the difference between the compasses is 5° 30' minus 3° 25', or 2° 5'. The receiver could have a dial 61 and pointer 61a, as is provided in the preferred receiver, the dial making one revolution for every 12 degrees in azimuth. He would then simply have to compare the reading of this dial with the time given by the clock.

The cover 90 is graduated as a compass card for setting the transmitter, being read against a lubber line fixed to the casing 88. Current is led to the collimator lamp and to lamps inside the clock for illuminating the dials at night through the two brushes 109 fixed to the casing 88 and the two slip rings 110 on the vertical shaft 99. Current for the chronograph motor 98 is supplied through the three brushes 111 fixed to the casing 88 and the three slip rings 112 attached to the spur ring 97.

The instruments described above have been devised to enable an observer to compare his compass with that of his leader at any time without altering the position of his ship in the convoy, but a considerable simplification is obtainable if the comparison is only made when there is a rate of change of bearing. In Figs. 1 and 2 the collimators may be fixed to the compass card 7, thus eliminating the chronograph, the azimuth of each collimator corresponding with a 6° mark on the compass. As the ships move relatively to each other the observer on the consort notes the azimuth on his own compass of the line of sight at the instant when the collimator is seen to flash. The deviation of this reading from the nearest multiple of 6° is the relative error of the two compasses. It is quite possible to use the instrument shown in Figs. 1 and 2 in this way in event of a breakdown in the chronograph motor by setting the collimators by means of the chronograph spindle so as to coincide with the 6° marks on the compass. Since in this form no zero lamp is required on the transmitter it would be an added advantage to substitute the reflectors of Fig. 3 for the collimators of Fig. 1 and have a single collimator on the receiver as already described. The only light used would then be that of the single collimator.

Another alternative method of use in event of a breakdown in the arrangement of Fig. 8 is to fix the collimators 105 to the ship so that they give 12° bearings relatively to the fore and aft line of the leader and the clock hands then give the compass bearings of the ship, less multiples of 12°. The observer on the consort then notes the bearing of the leader's instrument on his own compass when the collimator flash is seen and he knows that the line of sight at that instant has a bearing relatively to the leader which is some multiple of 12°. Hence its bearing in azimuth, less multiples of 12°, is given by the clock time read in degrees and minutes. He can then compare the clock time with his own observation, deducting from the latter all multiples of 12°.

When the rate of change of bearing is large, as when two ships are steaming in opposite directions, the interval between successive flashes of the zero lamp and collimator may be very small and would give the observer insufficient time to settle down to accurate training, in addition to the increased difficulty in keeping "on" in training. The observer in such cases might start his chronograph on the flash of the zero lamp and stop it on any subsequent flash of the collimator at which his training is correct. Alternatively to eliminate the necessity of being "on" accurately when the collimator flashes, I may fit a scale of azimuths in the eyepiece of the receiver so that if the collimator flashes when the observer is slightly off in training, he can note the position of this flash on the scale and then before reading his dial he turns the prisms through the angle which he noted (without turning the pointer 63) and thus obtains a correct comparison.

Still greater simplification of the transmitter is possible when it is required for a shore station to signal to ships at sea. In that case a compass at the transmitter is quite unnecessary as the meridian can be accurately determined and the transmitter permanently oriented when first erected. The transmitter may therefore be similar to any of the form already described but with the compass card fixed to the case with its North point directed to true north. It could have either a revolving collimator or a revolving mirror, but since there will as a rule be a rate of change of bearing between the transmitter and the ship it is possible to reduce the transmitter to the very simple form of a pillar or stout pole to which is rigidly attached a ring, or part of a ring, of fixed collimators or preferably double reflecting mirrors, like Fig. 3, facing seawards and accurately oriented. An observer on a passing ship has then merely to train his receiver on the transmitter and stop training when he sees the collimator flash. Any difference between his own measured azimuth and the nearest multiple of 6° must be the error of his compass with reference to true north. He can therefore set his course accurately and also, if he knows his speed, he can calculate his distance from the transmitter and fix his position by measuring the time between two successive flashes from the collimator. Such simple transmitters would be very useful if erected on lighthouses, promontories, isolated islands or rocks where ships first come in contact with land, also in confined channels where a compass error of comparatively small amount may have serious results and where also the congestion of traffic and the sinuosity of the course multiply the causes of error of the compass.

The foregoing description has been confined in its details to the use of luminous radiation but it is evident that the method applies equally when used with well-known suitable detectors of electro-magnetic radiation of other than luminous frequency or for sound radiation of audible or inaudible frequency. Also even in the methods illustrated many alternative constructions and arrangements are possible without departing from the spirit of the broad invention.

I claim:—

1. Apparatus for determining on a ship the azimuthal bearing of the ship relatively to an azimuth indicator at a distant station, comprising at the station an azimuth indicator, a beam-reflector rotating in azimuth relative thereto and adapted to reflect back to the ship a beam signal directed thereon by the ship when said reflector is normal to the direction of said beam, and means to make a predetermined signal when said rotating reflector passes predetermined bearings on said azimuth indicator, means on the ship to direct on said reflector a beam signal, chronographic means running at a speed proportional to the rotary speed of said reflector and means actuated thereby in accordance with the time interval between receipt of one of said predetermined signals from the distant station and a subsequent reflection of said beam signal for determining the angular movement of said reflector during the said time interval.

2. Apparatus for comparing the azimuth of the cardinal points of a ship's compass with that of the corresponding points of an azimuth indicator at a distant station, comprising at the distant station an azimuth indicator, a reflector rotating uniformly relatively thereto adapted to reflect back to the ship a beam signal directed thereon when said reflector is normal to the direction of said beam signal, and means to make a predetermined signal when said rotating reflector passes predetermined bearings on said azimuth indicator, means on the ship to direct on said reflector a beam signal, a chronographic mechanism having a speed proportional to that of said reflector and actuated in accordance with the time interval between receipt of one of said predetermined signals and a subsequent reflection of said beam signal for determining the angular movement of said reflector during said time interval, and means to determine the azimuth of said signalling means relatively to the ship's compass at the moment of said reflection.

3. In apparatus for use on a ship to measure and indicate the azimuth of distant objects relatively to the ship's compass, a turntable pivoted for training movement on the ship, a compass, a compass card element pivoted coaxially with said turntable, means for controlling the compass card element in azimuth by said compass independently of said turntable, a sighting device comprising optical elements attached to the turntable and coacting optical elements for controlling the direction of the line of sight of said sighting device, said coacting optical elements being mounted on the compass card element so as to stabilize the line of sight in azimuth irrespective of training movements of the turntable and the optical elements attached thereto, means to adjust said coacting optical elements relatively to the compass card element, and means to indicate the bearing of said coacting optical elements relatively to the compass card element.

4. In apparatus for use on a ship to measure and indicate the bearing of distant objects relatively to the ship's compass, a turntable mounted for training movement relatively to the ship, a compass, a compass card element pivoted coaxially with said turntable, means for controlling the compass card element in azimuth by said compass independently of the training of the turntable, a sighting device comprising optical elements carried by the turntable and coacting optical elements mounted on the compass card element, said coacting elements controlling the direction of the line of sight of the sighting device, auxiliary means to adjust the said coacting elements in azimuth relatively to the compass card element, and indicating means controlled by angular movements of the said coacting elements relatively to the compass card element to indicate on a magnified scale the azimuth of the line of sight of the said sighting device.

5. In apparatus for use on a ship to measure and indicate the bearings of distant objects relatively to the ship's compass, a turntable pivoted for training movement relatively to the ship, a compass, a compass card element pivoted coaxially with said turntable for independent movement in azimuth, means for controlling the compass card element in azimuth by said compass, a sighting device comprising a plurality of optical elements carried by the turntable and coacting optical elements carried by the compass card element, said coacting optical elements controlling the direction of the line of sight of the sighting device, means to rotate said coacting optical elements in azimuth relatively to the compass card element, and auxiliary means to move the coacting optical elements in elevation relatively to the compass card element.

6. In apparatus for use on a ship to determine the bearings of distant objects relatively to the ship's compass, a turntable pivoted for training movement relatively to the ship, a compass, a repeater compass card pivoted coaxially with said turntable, means for controlling the compass card by the compass and a sighting device having optical elements carried by the turntable and a line of sight determining member controlled by said compass card independently of said turntable, means associated with said member and compass card and operable to move the said member in azimuth relatively to the compass card, and indicating means actuable by said operable means to indicate the bearing of the line of sight of the sighting device irrespective of the heading of the ship.

7. In apparatus for use on a ship to determine the bearings of distant objects relatively to the ship's compass, a compass, a repeater compass card element, means for controlling the compass card element by the compass, a turntable pivoted on the ship for training movement relatively to the ship coaxially with the said compass card element, a sighting device having optical elements controlled in azimuth by said turntable independently of the compass card element, and a line of sight determining member controlled in azimuth by said compass card element independently of said turntable, means associated with said line of sight determining member and compass card element and operable to move the said member in azimuth relatively to the compass card element, an index fixed relatively to said member, and an indicator actuated by relative movements in azimuth between the said member and compass card element to indicate on a magnified scale against said index the amount of said relative movements.

8. Apparatus for comparing the readings of two compasses situated at two stations remote from, but visible to, each other, comprising at one of the stations a compass, an element rotatable in azimuth at constant speed, means to make a visual signal to the other station when the said rotary element is on a known bearing relatively to said compass, means to make a second visual signal to the other station when the said rotary element is aligned with the line of sight between the two stations; and at the other station a compass, a sighting device associated therewith and adapted to be directed on the first station, an indicator actuated by said second compass and sighting device for indicating the bearing of the said line of sight relatively to said second compass, a chronographic mechanism running at constant speed, and a second indicator adapted to be engaged with said chronographic mechanism during the time interval between said first and second signals to indicate the bearing of said line of sight relatively to said known bearing on said first compass at the moment when the second signal is seen at the second station.

9. Apparatus for comparing the readings of two compasses situated at two stations remote from, but visible to, each other, comprising at one of the stations a compass, an element rotatable in azimuth at constant speed, means to make a visual signal to the other station when said rotary element is on a known bearing relatively to said compass, a collimator associated with said element and adapted to project a narrow horizontal beam of light, said beam rotating in azimuth with said rotary element; and at the other station a compass, means to determine relatively thereto the bearing of said collimator when the flash of its rotating beam is seen at the second station, and means to determine the angular movement of said beam between said signal and said flash.

10. Apparatus for comparing the readings of two compasses situated at two stations remote from, but visible to, each other, comprising at one of the stations a compass, an element rotatable in azimuth at constant speed, a collimator rotating with said element and adapted to project a narrow horizontal beam of light, and means to make a visual signal to the other station when said beam is on a known bearing relatively to said compass; and at the other station a compass, a sighting device for viewing said collimator, means to indicate the bearing of the line of sight to said collimator at the moment when the flash of the collimator beam is seen, a chronographic mechanism running at constant speed, and a second indicator adapted to be actuated thereby in accordance with the time interval between said visual signal and said flash to indicate the bearing of said beam relatively to said first compass at the moment when the flash of said beam is seen at the second station.

11. Apparatus for comparing the readings of two compasses situated at two stations remote from, but visible to, each other, comprising at one of the stations a compass, an element rotatable in azimuth at constant speed, means to make a visual signal to the other station when said element is on a known bearing relatively to said compass, a reflector associated with said element and adapted to reflect back to the other station a beam of light emitted therefrom when said reflector is at right angles to the line of sight joining the two stations; and at the other station a compass, a sighting device adapted to be directed on said first station, a collimator adapted to project a narrow beam of light parallel to the line of sight of said sighting device, means to determine the bearing of said collimator beam relatively to said second compass, and other means to determine the bearing of said beam relatively to said known bearing on said first compass at the moment when said beam is reflected by said reflector including a chronographic mechanism running at constant speed during the time interval between said first signal and said reflection of the beam.

12. Apparatus for comparing the readings of two compasses situated at two stations remote from, but visible to, each other, comprising at one of the stations a compass, an element rotatable in azimuth at constant speed, means to make a visual signal to the other station when said element is on a known bearing relatively to said compass, a reflector associated with said element and adapted to reflect back to the other station a beam of light emitted therefrom when said element is directed along the line of sight joining the two stations; and at the other station a compass, a sighting device, a collimator adapted to project a narrow beam of light parallel to the line of sight of said sighting device, means to indicate the bearing of said line of sight relatively to said second compass, and means to indicate the bearing of the line of sight between the two stations relatively to said first compass at a particular moment, said indicating means comprising a chronographic mechanism running at constant speed and an indicator adapted to be engaged therewith in accordance with the time interval between said first signal and a subsequent reflection of the collimator beam by said reflector.

13. Apparatus for comparing the readings of two compasses situated at two stations remote from, but visible to, each other, comprising at one of the stations a compass, an element rotatable in azimuth, signalling means for making a visual signal to the other station when said rotary element is directed along the line of sight joining the two stations and an indicator visible to the other station for indicating continuously the bearing of said element relatively to said compass; and at the other station a compass, a sighting device adapted to be directed on said first station and an indicator for indicating the bearing of the line of sight of said device relatively to said second compass.

14. Apparatus for signalling automatically to a ship the bearing of the ship relatively to an azimuth indicator at a distant station, comprising at the station an azimuth indicator, an element rotating in azimuth relatively to said indicator at a constant speed, visual signalling means actuated in accordance with coincidence between the element and a predetermined bearing on said indicator to indicate to the ship the moment of said coincidence, and other visual signalling means fixed relatively to the element for emitting a steady beam of light rotating in azimuth with the element, said beam being of narrow angle in azimuth so as to be visible to the ship only when the element is pointed at the ship.

15. Apparatus for determining on a ship the bearing of the ship relatively to an azimuth indicator at a distant station, comprising at the station an azimuth indicator, an element rotating in azimuth relatively thereto at a constant speed, visual signalling means actuated automatically in accordance with coincidence between the element and a predetermined bearing on the said indicator to indicate to the ship the moment of said coincidence, and other visual signalling means fixed relatively to said element for emitting a steady beam of light rotating in azimuth with the element, said beam being of narrow angle in azimuth so as to be visible at the ship only when the element points at the ship; and on the ship chronographic means running at a speed proportionate to the rotary speed of the element, and an indicator adapted to be actuated by said chronographic means during the time interval between said two signals for indicating the change of bearing of the said element during said time interval.

16. Apparatus for comparing the compass on a ship with an azimuth indicator at a distant station, comprising at the station an azimuth indicator, an element rotating in azimuth relatively thereto, visual signalling means actuated in accordance with coincidence between the element and a predetermined bearing on the azimuth indicator to signal to the ship the moment of said coincidence, other visual signalling means associated with the rotating element for indicating to the ship the moment of coincidence between the element and the line of sight from station to ship; and on the ship chronographic means running at a speed proportionate to the rotary speed of the said element, indicating means adapted to be actuated by said chronographic means during the time interval between said two signals to indicate the bearing of said line of sight at the moment of said second signal relatively to the distant azimuth indicator, a compass, a sighting device associated with and trainable relatively to said compass and adapted to be directed on said signalling means, and a second indicator actuated by training movements of the sighting device relatively to the compass to indicate the bearing of said signalling means relatively to said compass at the moment of said second signal.

17. Apparatus for signalling automatically to a ship from a distant station the bearing of a line of sight from station to ship relatively to an azimuth indicator at the said station, comprising at the station an azimuth indicator, an element rotating in azimuth relatively thereto, a lamp, a switch for controlling the lamp, a second lamp, a tube surrounding the second lamp and rotating in azimuth with said element, a plurality of narrow equally spaced slits in said tube to provide a like number of narrow-angle rotating beams of light from said second lamp, and means actuated by movement of the element relatively to the azimuth indicator for actuating said switch at the moment when the said rotating beams of light coincide with predetermined bearings on said azimuth indicator.

18. Apparatus for comparing the azimuth of the cardinal points of a ship's compass with that of the corresponding points of an azimuth indicator at a distant station, comprising at the station an azimuth indicator, an element uniformly rotated relatively thereto in azimuth, means actuated in accordance with coincidence between the element and a predetermined bearing on the azimuth indicator for making automatically a visual signal at the moment of said coincidence, and other means rotating synchronously with the rotary element for projecting a beam of light along the bearing of said element, said beam having a narrow angle in azimuth so as to be visible to the ship only when the element points at the ship; and on the ship a chronographic mechanism running at a speed proportionate to the rotary speed of said element, indicating means adapted to be actuated by said chronographic mechanism during the time interval between said two signals for determining the bearing of said beam relatively to the azimuth indicator at the moment when said beam is seen at the ship, a compass and a sighting device associated with said compass and trainable relatively thereto and adapted to be kept directed on said visual signals at the distant station to determine the bearing of said beam relatively to said compass at the moment when the said beam is seen in said sighting device.

19. Apparatus for enabling a ship to obtain her own bearing relatively to an azimuth indicator situated at a distant station, comprising at the station an azimuth indicator, an element rotating in azimuth relatively thereto, means actuated in accordance with coincidence between the element and a predetermined bearing on the azimuth indicator for making a visual signal at the moment of said coincidence, an optical reflector rotating in azimuth synchronously with said element and adapted to reflect back to its source a beam of light projected thereon when the directions of the beam and element coincide; and on the ship means to project a narrow beam of light on said reflector and indicating means actuable at a speed proportionate to the rotary speed of said element during the time interval between said first signal and a subsequent reflection of said beam to indicate the angular divergence between the bearing of the ship relatively to said azimuth indicator and the said predetermined bearing.

20. Apparatus for comparing a ship's compass with an azimuth indicator at a distant station, comprising at the station an azimuth indicator, an element rotating in azimuth relatively thereto, means associated with the element for projecting a plurality of equally spaced horizontal beams of light rotating in azimuth with the element, each of said beams having a narrow angle in azimuth so as to be visible to the ship only when the beam coincides with a line of sight from station to ship, and indicating means mounted adjacent to said last means so as to be visible to the ship to indicate continuously the movement of one of said rotating beams relatively to the azimuth indicator; and on the ship a compass, a sighting device rotatable in azimuth relatively thereto for viewing said indicating means, and an indicator responsive to azimuthal movements of said sighting device relatively to said compass for indicating relatively to said compass the bearing of the line of sight to the said indicating means at the moment when one of said beams is seen.

21. Apparatus for comparing a ship's compass with an azimuth indicator at a distant station, comprising at the station an azimuth indicator, an optical reflector rotated in azimuth relatively thereto and adapted to reflect back to its source a horizontal beam of light projected thereon when said reflector is normal to said beam, and indicating means actuated by movement of the reflector relatively to the azimuth indicator to indicate continuously the azimuth of the reflector relatively to the azimuth indicator; and on the ship a compass, means rotatable in azimuth relatively to the compass for projecting a narrow beam of light, a sighting device for reading said distant indicating means and having its line of sight parallel to said beam and rotatable in azimuth therewith, means to direct said beam and line of sight on said reflector and indicating means, and an indicator operated by relative movements in azimuth between said sighting device and compass for indicating relatively to said compass the azimuth of said beam at the moment when said beam is reflected back to the sighting device.

22. Apparatus for comparing the readings of a ship's compass with known bearings at a distant station, comprising at the station a reflector arranged at right angles to a known bearing and adapted to reflect back to its source a beam of light directed thereon at 180° to said known bearing, and on the ship a compass, a sighting device rotatable in azimuth relatively thereto and adapted to be directed on said reflector, means to project a beam of light parallel to the line of sight of said sighting device, and means to indicate the bearing of said line of sight and beam relatively to the compass at the moment when movement of the ship relatively to the distant station causes the beam of light to be reflected back to the said sighting device.

JAMES BLACKLOCK HENDERSON.